United States Patent
Biederman et al.

(10) Patent No.: US 7,730,202 B1
(45) Date of Patent: Jun. 1, 2010

(54) DYNAMIC INTERRUPT TIMER

(75) Inventors: Daniel C. Biederman, San Jose, CA (US); Malathy Sethuraman, San Jose, CA (US); Jeffrey P. Chou, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 1252 days.

(21) Appl. No.: 09/906,589

(22) Filed: Jul. 16, 2001

(51) Int. Cl.
*G06F 15/16* (2006.01)

(52) U.S. Cl. .................. 709/235; 709/203; 709/223; 710/260

(58) Field of Classification Search .......... 709/203, 709/225, 228, 233, 220, 221, 224, 248, 223, 709/232, 235; 710/260; 370/464
See application file for complete search history.

(56) References Cited

U.S. PATENT DOCUMENTS

| | | | |
|---|---|---|---|
| 5,359,593 A | 10/1994 | Derby et al. | 370/17 |
| 5,613,129 A * | 3/1997 | Walsh | 710/262 |
| 5,784,554 A | 7/1998 | Hsiung | 395/183.21 |
| 5,808,952 A | 9/1998 | Fung et al. | 365/222 |
| 5,815,492 A | 9/1998 | Berthaud et al. | 370/234 |
| 6,006,019 A * | 12/1999 | Takei | 709/224 |
| 6,011,776 A | 1/2000 | Berthaud et al. | 370/232 |
| 6,115,776 A * | 9/2000 | Reid et al. | 710/260 |
| 6,118,791 A | 9/2000 | Fichou et al. | 370/468 |
| 6,304,900 B1 * | 10/2001 | Cromer et al. | 709/224 |
| 6,310,892 B1 * | 10/2001 | Olkin | 370/473 |
| 6,405,337 B1 * | 6/2002 | Grohn et al. | 714/749 |
| 6,438,105 B1 * | 8/2002 | Qarni et al. | 370/235 |
| 6,467,008 B1 * | 10/2002 | Gentry, Jr. et al. | 710/261 |
| 6,606,661 B1 * | 8/2003 | Agrawal et al. | 709/227 |
| 6,609,151 B1 * | 8/2003 | Khanna et al. | 709/220 |
| 6,724,732 B1 * | 4/2004 | Abrams et al. | 370/252 |
| 6,968,392 B1 * | 11/2005 | Wilford et al. | 709/240 |
| 7,065,598 B2 * | 6/2006 | Connor et al. | 710/260 |
| 7,203,767 B2 * | 4/2007 | Khanna et al. | 709/248 |
| 2002/0188749 A1 * | 12/2002 | Gaur | 709/234 |
| 2003/0012222 A1 * | 1/2003 | Rinchiuso | 370/468 |

* cited by examiner

*Primary Examiner*—Ramy M Osman
(74) *Attorney, Agent, or Firm*—Campbell Stephenson LLP (57) ABSTRACT

A method of adjusting a timer is disclosed. The method includes adjusting a timer activation period based on a characteristic of a network and setting the timer using the timer activation period. The timer is used in communicating information over the network.

48 Claims, 9 Drawing Sheets

DYNAMIC INTERRUPT TIMER

BACKGROUND OF THE INVENTION

1. Field of the Invention

This invention relates to timers in digital systems that have adjustable granularity, granularity which dynamically adjusts to communication conditions.

2. Description of the Related Art

In many digital systems, such as communication systems and computer systems, streams of information (data) between parties do not travel in a continuous fashion. Typical to many digital systems, the information is provided in the form of small and manageable pieces. To properly manage packets and streams of information, digital systems make use of protocols such as the transmission control protocol (TCP).

Information in a digital system can be broken down into a basic piece of data called a frame. A flow is a series of frames exchanged between two connection endpoints defined by a network address and a port number pair for each end of the connection. Typically a flow is initiated by a request at one of the endpoints for content which is accessible through the other connection endpoint. The flow that is created in response to the request consist of packets containing the requested content and control messages exchanged between the two endpoints.

Examples of exchanges of information include requests and transmission of data to and from client entities (client) and server entities (server). Typically, a client is the requesting endpoint; however, the server at times also requests information from a client. Applications of digital systems include transactions on the Internet, where the client is an individual connecting to a host's site and the host's site is considered the server. The individual requests information from the host site. Information is then transmitted along the Internet from the host site to the individual. In the case of electronic commerce on the Internet, the individual and the host site exchange various information packets with one another. The individual browses the host's site for specific products and/or services. The host site responds with availability and price of the goods and services. The individual responds with an order, which can include credit card information and shipping information.

The use of protocols allows efficient management of information and exchange over communication networks such as the Internet. Protocols are able to decide how to break up the transmission of information. As an example, using TCP, when a receiver (e.g., server) receives a request packet, the receiver sends an acknowledge packet back to the sender (e.g., client). If the sender does not receive an acknowledge packet after an allotted amount of time, TCP requires that the sender retransmit the packet. Other features of TCP allow for flow control; a receiver allows the sender to send only as much information at a time that the receiver's data buffers can store.

TCP and other communication protocols implement the use of timers. Timers are used to acknowledge control, and initiate and request (or re-initiate) transmission of information and information packets. Timers can also be implemented to control and monitor events. TCP includes, among other timers, an acknowledge timer, a round trip timer, a persist timer, and a keep alive timer. In TCP, timers can have a range of 200 milliseconds (ms) to several seconds.

Associated with each timer is the concept of granularity. Granularity relates to the number of interrupts over a defined time period. An interrupt is when a timer activates. The fewer number of interrupts over the defined time period, the lesser the granularity. In other words, if a timer activates (interrupts) 10 times over the defined time period, the granularity is lesser than if the timer activates (interrupts) 20 times over the same defined time period.

Under ideal conditions, communications between a client and a server are immediate and continuous. In other words, a client would not have to wait to be connected to a server, and information exchange is not interrupted. Practical conditions, however, include instances when connections between clients and servers are less than ideal. Using the example of the Internet, during certain times numerous clients (individuals) are accessing, or trying to access, the server (host site). The server in turn is trying to handle the requests from each of the clients. As more and more clients try to access the server, resources, in particular memory bandwidth, become constrained. An increased number of clients leads to increased congestion along the communication path (memory bandwidth). Processors handling the data flows are forced to handle numerous information flows. Processors responsible for computing received information are inundated with retransmitted packets. The retransmitted packets are packets containing information that has yet to be processed. Situations in which packets can be retransmitted are when an entity does not receive an acknowledge packet, the timer is started and after the set time the packet is retransmitted. Received packets that are yet to be processed, can be stored in memory buffers of devices; however, memory buffers are a limited resource that can be quickly filled during periods of peak network traffic. If memory buffers fill up, a retransmit can be requested, or transmission can be ceased.

Traffic related to information flows over networks, such as the Internet, varies depending on various factors. A simplistic example of congestion takes place when numerous clients are attempting to access a particular server. Factors that affect information (data) flows include the current data stream bandwidth, the number of data flows (TCP flows), the number of requests for memory access, the current network traffic, network congestion, the time of day, the season of the year, or a combination of any of the factors.

As networks become congested (i.e., experience more traffic), and resources become constrained, in particular as processors are asked to handle increased data streams (flows), connections are terminated and lost by the inability to properly service all client and server demands. Overall communication transactions are slowed with the increased congestion on the networks. Customers that are trying to purchase goods and/or services from server host sites are dropped. Dropped connections lead to frustrated customers who may decide not to continue transaction with the host site and seek business elsewhere.

SUMMARY OF THE INVENTION

In one embodiment, a method of adjusting a timer is disclosed. The method includes adjusting a timer activation period based on a characteristic of a network and setting the timer using the timer activation period. The timer is used in communicating information over the network.

In another embodiment, a timing unit for a network is disclosed. The timing unit includes a timer and a timing control unit. The timing control unit is coupled to the timer, and is configured to adjust a timer activation period based on a characteristic of the network. The timing control unit is also configured to provide the timer activation period to the timer.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings. The use of the same reference number throughout the figures designates a like or similar element.

While the invention is susceptible to various modifications and alternative forms, specific embodiments thereof are shown by way of example in the drawings and will herein be described in detail, it should be understood, however, that the drawings and detailed description thereto are not intended to limit the invention to the particular aim disclosed but on the contrary, the intention is to cover all modifications, equivalents, and alternatives falling within the scope of the present invention as defined by the appended claims.

DETAILED DESCRIPTION

Figure 1:
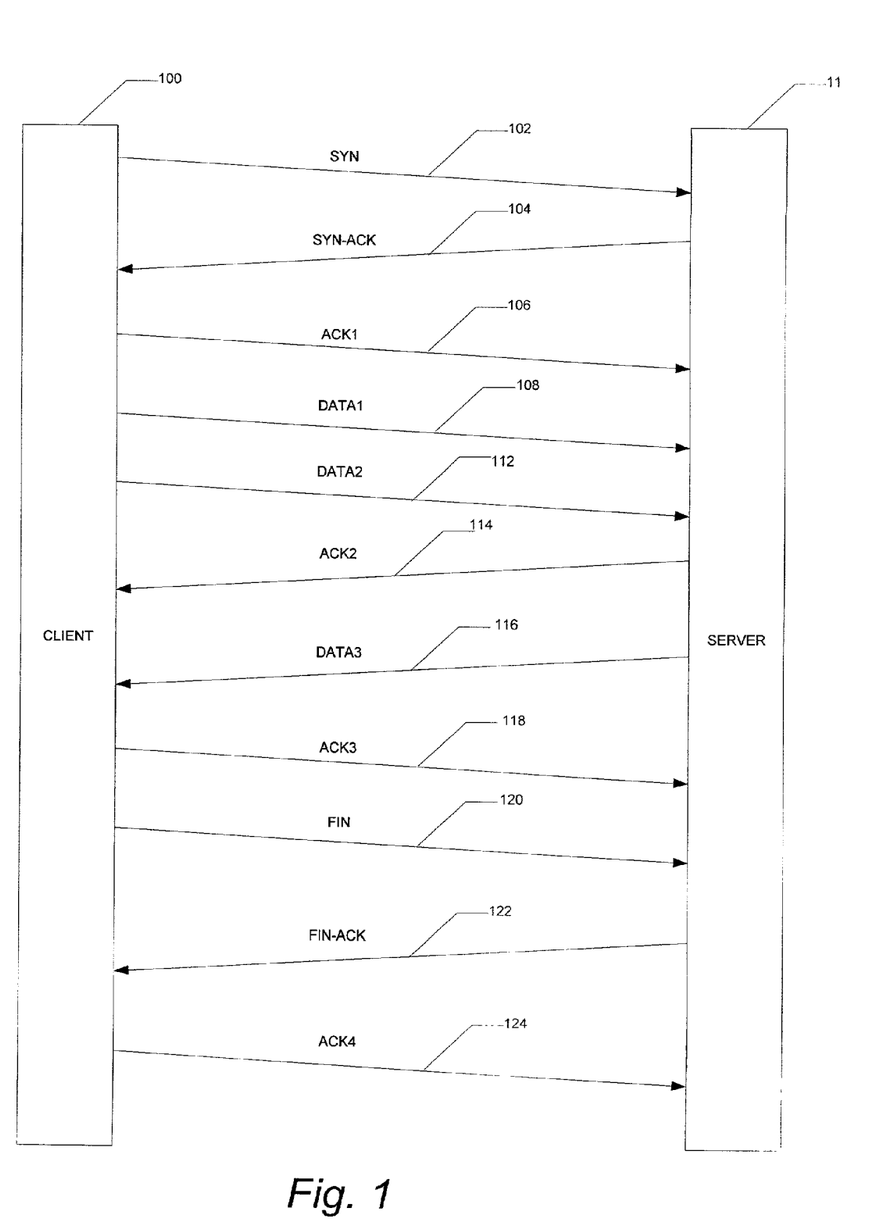
FIG. 1 illustrates a transmission flow between a client and server.

FIG. 1 is a block diagram illustrating transmission between a client 100 and a server 110. Client 100 transmits a synchronize (SYN) packet 102 to server 110. Server 110 acknowledges packet 102 by transmitting a SYN-ACK packet 104 to client 100. Client 100 responds to server 110 by transmitting an acknowledge (ACK) packet 106. Information is transmitted in the form of packets DATA1 108 and DATA2 112 from client 100 to server 110. Server 110 acknowledges receipt of this information by transmitting an ACK packet 114. Along with ACK packet 114, information such as DATA3 116 can be transmitted to client 100. Client 100 acknowledges receipt of DATA3 116 by transmitting an ACK packet 118. Client 100 terminates transmission flow made by client 100 by transmitting a FIN packet 120 to server 110. A FIN-ACK packet 122 is sent to client 100 to acknowledge that server 110 recognizes that transmission is ended. Client 100 in turn transmits an ACK packet 124 to complete transmission.

In this direct communication from client to server, timers can be used to control when retransmission of packets is performed, if retransmission is required. There is a connection establishment timer for SYN packets, a retransmission timer for ACK packet, a 2MSL timer (timer to measure time that a connection has been in the TIME_WAIT state) to avoid reusing current socket pairs, a persist timer to verify window size, and a keep alive timer to verify that a connection is still active. Additional timers may exist depending on TCP implementation. Client 100 and server 110 can incorporate memory buffers to store packet information.

Figure 2:
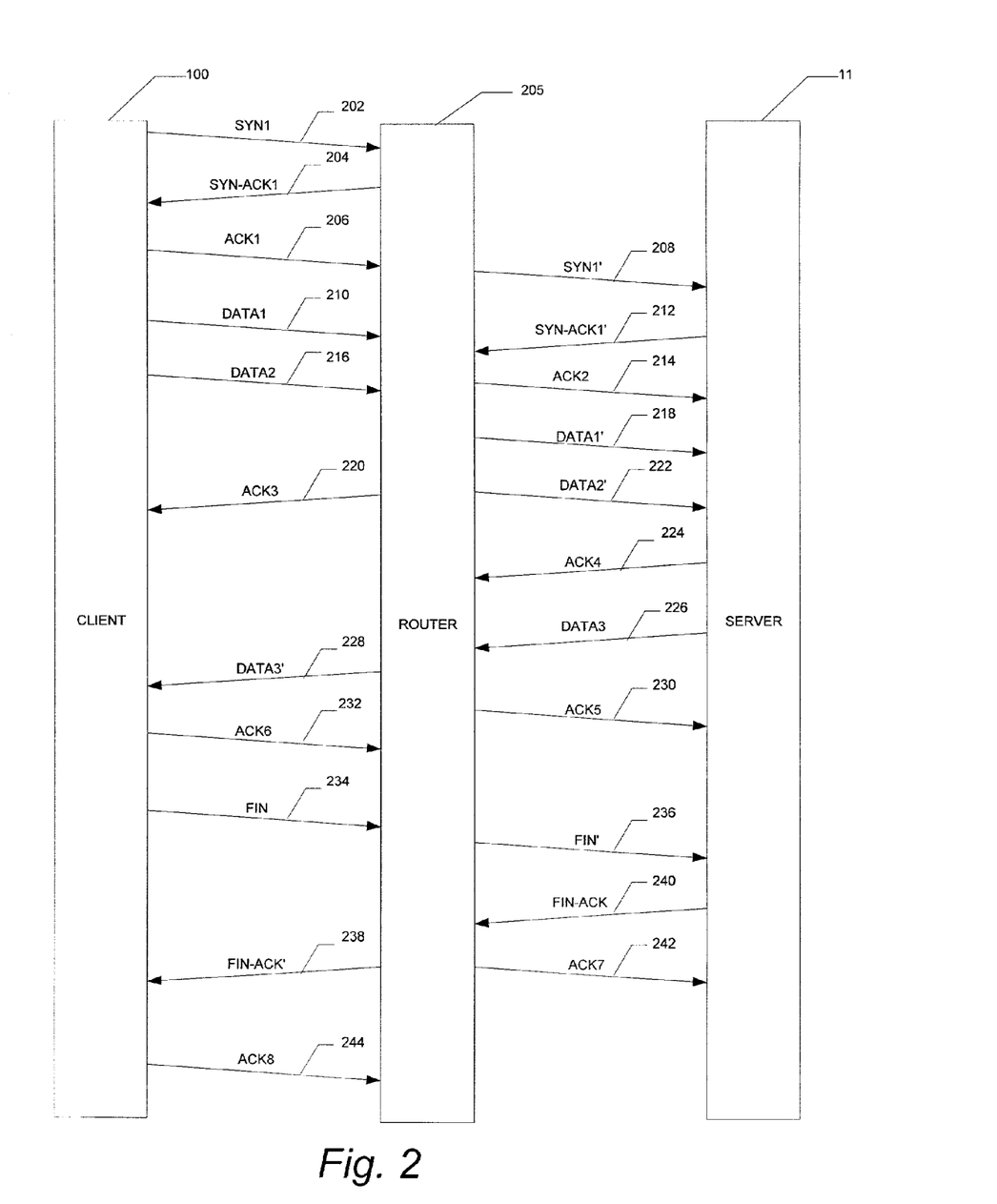
FIG. 2 illustrates a transmission flow between a client and server with a router intermediary.

FIG. 2 is a block diagram illustrating transmission between client 100 and server 110, with the use of an intermediary device. In this particular example a router 205 is illustrated as the intermediary device. Router 205 intercepts the flows from client 100 and generates a new flow between itself and server 110. Therefore, two flows exist, with one flow between client 100 and router 205, and a second flow between router 205 and server 110. In a digital system that employs an intermediate device such as router 205, router 205 controls information that passes between client 100 and server 110. Communication paths are established from router 205, namely between client 100 and server 110. In certain cases, congestion and constrained resources are greater at server 110, at other times at client 100, and at certain times resources are equally congested and constrained for both server 110 and client 100. Client 100, server 110, and router 205 can make use of memory buffers to store packet information with the memory buffer storing excess data.

When client 100 desires to transmit information, client 100 transmits a SYN1 packet 202 to router 205. Router 205 acknowledges receipt of SYN1 packet 202, by transmitting a SYN-ACK1 packet 204 to client 100. Client 100 sends an ACK1 packet 206 to router 205. Information from client 100 is transmitted to router 205 in the form of packets DATA1 210 and DATA2 216.

Router 205 establishes communication with server 110 by transmitting a SYN1' packet 208. Server 110 replies to router 205 with a SYN-ACK1' packet 212. Router 205 transmits an ACK2 packet 214 to server 110 recognizing SYN-ACK1' packet 212. Router 205 is then authorized to transmit packets DATA1' 218 and DATA2' 222 to server 110.

Server 110 has the ability to transmit information back to client 100. This process is illustrated by server 110 sending a DATA3 packet 226 to router 205. Router 205 passes DATA3' packet 228 along to client 100. Router 205 also sends an ACK5 packet 230 back to server 110, acknowledging receipt of DATA3 packet 226 from server 110. The client 100 transmits an ACK6 232 packet to router 205 acknowledging receipt of DATA3' packet 228 from router 205. ACK3 packet 220 is sent from router 205 to recognize receipt of DATA1 210 and DATA2 216 packets. ACK4 packet 224 is sent from server 110 to recognize receipt of DATA1' 218 and DATA2' 222 packets.

In this particular example, client 100 wishes to terminate communication, and sends a FIN packet 234 to router 205. Router 205 advises server 110 that client 100 desires to end communication by sending a FIN' packet 236 to server 110. Server 110 acknowledges FIN' packet 236 by transmitting a FIN-ACK packet 240 to router 205. Router 205 acknowledges FIN-ACK packet 240 by transmitting an ACK7 packet 242 to server 110. Router 205 sends a FIN-ACK' packet 238 to client 100. Client 100, in turn, acknowledges FIN-ACK' packet 238 by transmitting an ACK8 packet 244 back to router 205.

Variations of the configurations with client(s) and server(s) are possible. There can be multiple clients and servers, and multiple intermediary devices (e.g., routers). Regardless of the configuration that is used in transmitting and receiving packets; a timer is associated with the each of the packets.

Associated with each timer is a specific granularity. Historically, granularity is a predetermined and set value for each timer. To account for experienced or anticipated congestion (e.g., increased traffic flows), timer granularity can be altered (e.g., decreased or increased). In other words, the time between timer interrupts or timer activation can be decreased or increased. A decrease in granularity allows processors, specifically processors in transmitting and receiving devices, to limit the computing that the processors are requested to perform. When less network congestion is experienced, and/or when resources are less constrained, granularity can be increased. In other words, a shorter period is seen for timer activation (i.e., interrupts). An increase in granularity allows transmission between devices to occur more rapidly.

With a decrease in granularity, as packets are transmitted to and from devices, processors responsible for receiving and transmitting packets (e.g., information) are able to keep up with processing during situations in which congestion exists or is anticipated. An example of events or situations in which congestion exists includes peak shopping seasons where a multitude of individuals are attempting to access shopping sites. Another situation is a busy time of day in which individuals are checking their stock portfolios at their respective Internet brokerage sites. An example of an expected event that can cause congestion is when equipment is being repaired or maintained, limiting the capabilities of the network. Decrease or increase changes in granularity can be based on several metrics, metrics that are actually seen in the communication network or are anticipated in the communication network.

During peak congestion, granularity is decreased in order to alleviate the tasks imposed on processors that are handling the communication transfers of transmitted and received information. During less congested periods, granularity is increased to allow for quicker transmission of packets.

Figure 3:
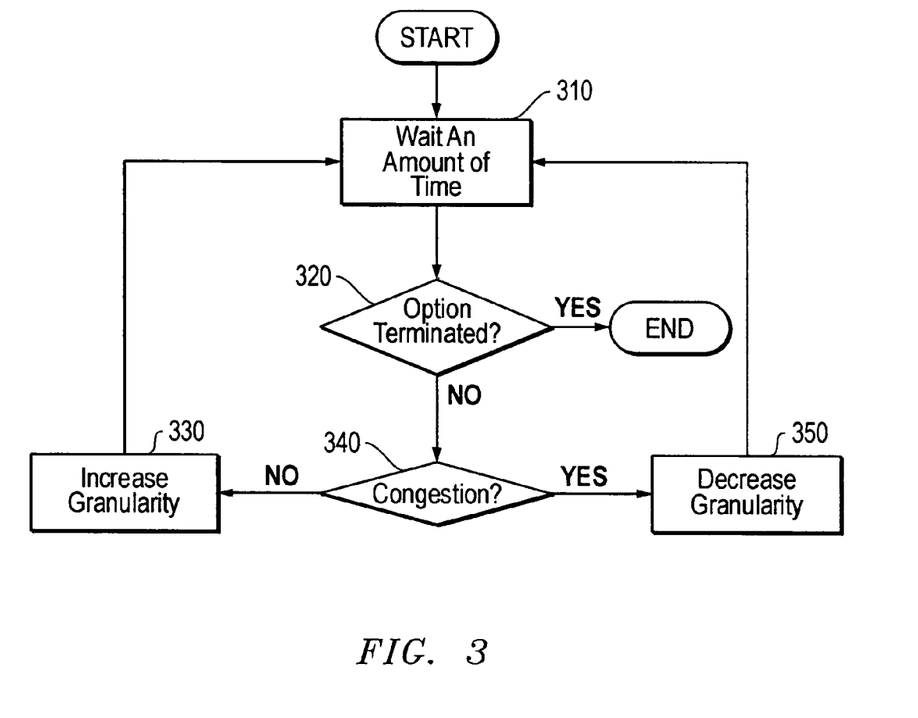
FIG. 3 is a flow chart illustrating detecting congestion and modifying timer granularity.

FIG. 3 illustrates a flow chart of a process that determines congestion in a network. A device that contains a timer receives a flow of transmission packets. Packets can be placed in a memory buffer if processors cannot immediately handle the transmitted packet, and the process may wait a set amount of time, step 310. A determination is made as to whether an option to receive flows is terminated, step 320. If the option is terminated, the process ends. If flows continue to be received, a device (e.g., a receiving or a sending device) determines congestion in the network, step 340. If congestion is seen, granularity is decreased, step 350. If congestion is not seen, granularity is increased, step 330. The process pauses for an amount of time, step 310, and then continues until transmission of the received or transmitted packet is complete, step 320.

A counter can be associated with each timer. The counter is increased whenever congestion flow is experienced. An increase in the counter relates to a decrease in the granularity of the timer. The counter measures delay or lack of transmission (processing) of a packet. The counter sets optimal granularity conditions by experienced flow or congestion. Examples of congestion include network congestion (i.e., congestion with a client network, such as the Internet, and between a client and a router); server network congestion (i.e., between router and server, or both); processor congestion (i.e., processor has more tasks to perform than time to perform the tasks); and memory congestion (i.e., the memory bandwidth is close to fully utilized, and additional requests for data from the memory adversely affects performance).

The increased wait, and time out requiring retransmission, increases the counter. Each incremental counter increase decreases the granularity of the timer. For example, an 8 bit binary counter can be used. For the first increase of the counter or the value of 00000001, granularity is decreased and the timer is set to activate every ten seconds. For the next counter increase or value of 00000010, granularity is changed so the timer activates every 20 seconds. The next counter increase or value of 00000011 decreases granularity and sets the timer activation to 30 seconds. The counter progressively increases as the delay of the packet transmission is experienced, the delay relating to network congestion. In this particular example, a maximum timer activation time is set to 160 seconds. With the 8 bit counter, only the first four bits need be used. The maximum value of 160 seconds is reached when the counter has the value of 00001111. Once the set maximum timer value (or minimum granularity) is reached, the granularity stays at the minimum value until congestion flow conditions favorably change.

A master counter can be employed, which increments at a continuous rate. Normally, the rate at which the master counter is incremented does not change. When the counter value changes, the processor is interrupted and all of the timer values stored in memory are read. If any of them expire, the corresponding event is scheduled for that TCP flow. If congestion is detected, the interrupts can be generated every other time (i.e., every two times) the counter changes values. Likewise, if congestion continues or increases, the interrupts can be generated every fourth time the counter changes values. This can continue (i.e., every eighth time, every sixteenth time, and so on). This is referred to herein as decreasing granularity. A decrease in granularity goes from many interrupts spaced closely that may cause a small number of events per interrupt to be executed, to few interrupts spaced further apart that usually causes a larger number of events to be executed per interrupt. In this particular example, a change in granularity is based on powers of two. The least significant bit of the counter can be examined for changes. As congestion increases, the second least significant bit is examined for changes; as the congestion further increases, the third significant bit can be examined for changes, and so on.

Figure 4:
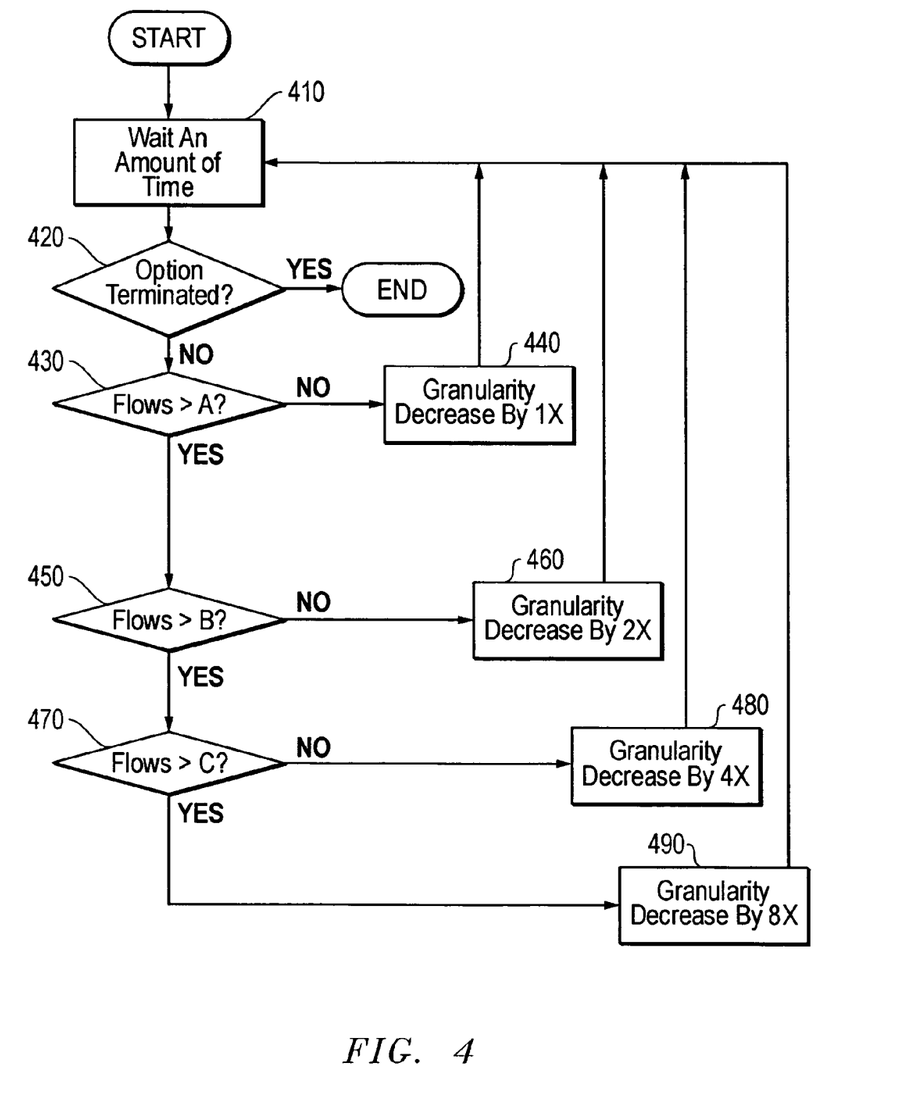
FIG. 4 is a flow chart illustrating detecting various flows and modifying timer granularity.

FIG. 4 is a flowchart illustrating a process of detecting various flows and modifying timer granularity. In a TCP network, a particular device can receive up to 128K flows per second. After such number of flows is exceeded, the memory buffers become full, and no more flows can be received. To allow continued transmission, granularity can be adjusted depending on the number of flows. Values that affect data flows include current data stream bandwidth; number of TCP flows; number of arbiter requests for memory access; current network traffic; network congestion; time of day (peak traffic expected or actually experienced); estimated traffic (season of the year); and a combination of the above. A determination can be made on actual or anticipated number of flows or congestion. A factor in estimating congestion is estimating data stream bandwidth. Data stream bandwidth estimates are derived by factors including the number of flows; arbiter device requests; network congestion (historical values); current time of delay (anticipated peak); and estimated traffic (related to event or season).

In an embodiment of the invention, granularity change can correspond directly to a preset value for the number of flows encountered. In this particular example, the receiving device controls the granularity change and measures the flow; however, a sending device can address the task of detecting flow and modifying granularity. A wait is performed for a predetermined amount of time, step 410. A determination is made as to whether the transmission is complete or if a memory buffer has accepted the transmission, step 420. If transmission is complete, the process ends. If continued transmission is seen, the number of flows is compared to the value A, step 430. If flows are not greater than A, the granularity remains the same, step 440. A wait is performed for the predetermined set of time, step 410, and a determination is made as to whether transmission is completed 420. If flows are greater than A, a determination is made to see if the flows are greater than B, step 450. If the flows are greater than A, but less than B, granularity is decreased by two, step 460. A wait is performed for the predetermined set of time, step 410, and a determination is made as to whether transmission is completed 420. A determination is made as to whether the flows are greater than B, but less than C, step 470. If flows are less than C, then granularity is decreased by four, step 480. In this particular example, the value of C is an upper limit value; if flows are greater than C, then granularity is decreased by eight, step 490. A wait is performed for the predetermined set of time, step 410, and a determination is made as to whether transmission is completed 420.

Flow control can also be measured by high and low watermarks. The status of the watermark determines flow, is used to determine flow control, and in turn determines the granularity of the timer. Flows can be assigned a high watermark and a low watermark. The high watermark value indicates the upper limit related to the number of frames contained in the flow. When the flow reaches the high watermark, granularity can be increased. When the flow reaches the low watermark, granularity can be decreased. Memory buffers can also make use of the high and low watermark concept, and adjust the granularity of the respective timers accordingly.

Figure 5:
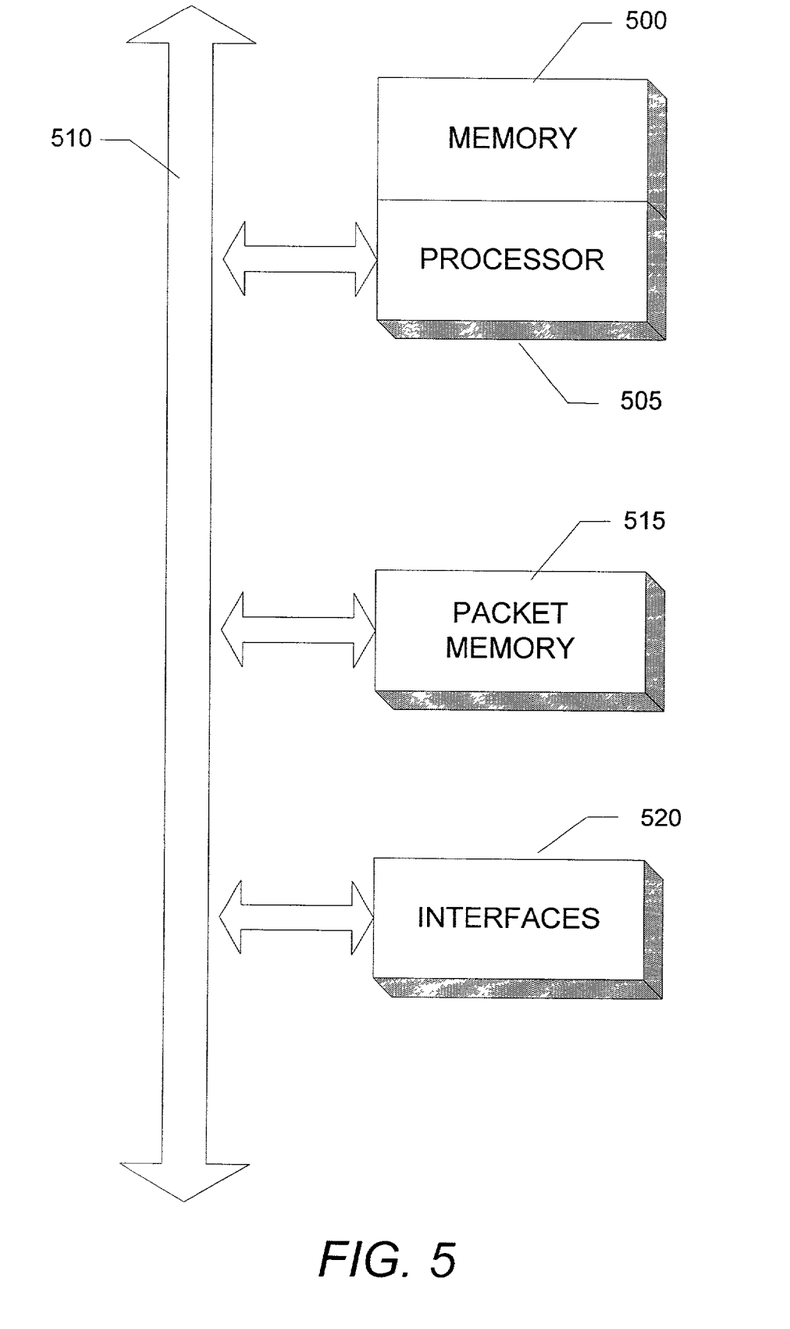
FIG. 5 is a block diagram illustrating a router.

FIG. 5 is a block diagram illustrating a router. A router can include a memory 500 that is directly interfaced to a processor 505. Processor 505 communicates to an internal bus 510. Router bus communicates to a packet memory 515. Packet memory can be used to store flows prior to processing by the processor 505. An interface or interfaces 520 provides connection to an external network from the router. Interfaces 520 communicates to the other devices in the router by way of bus 510.

Figure 6:
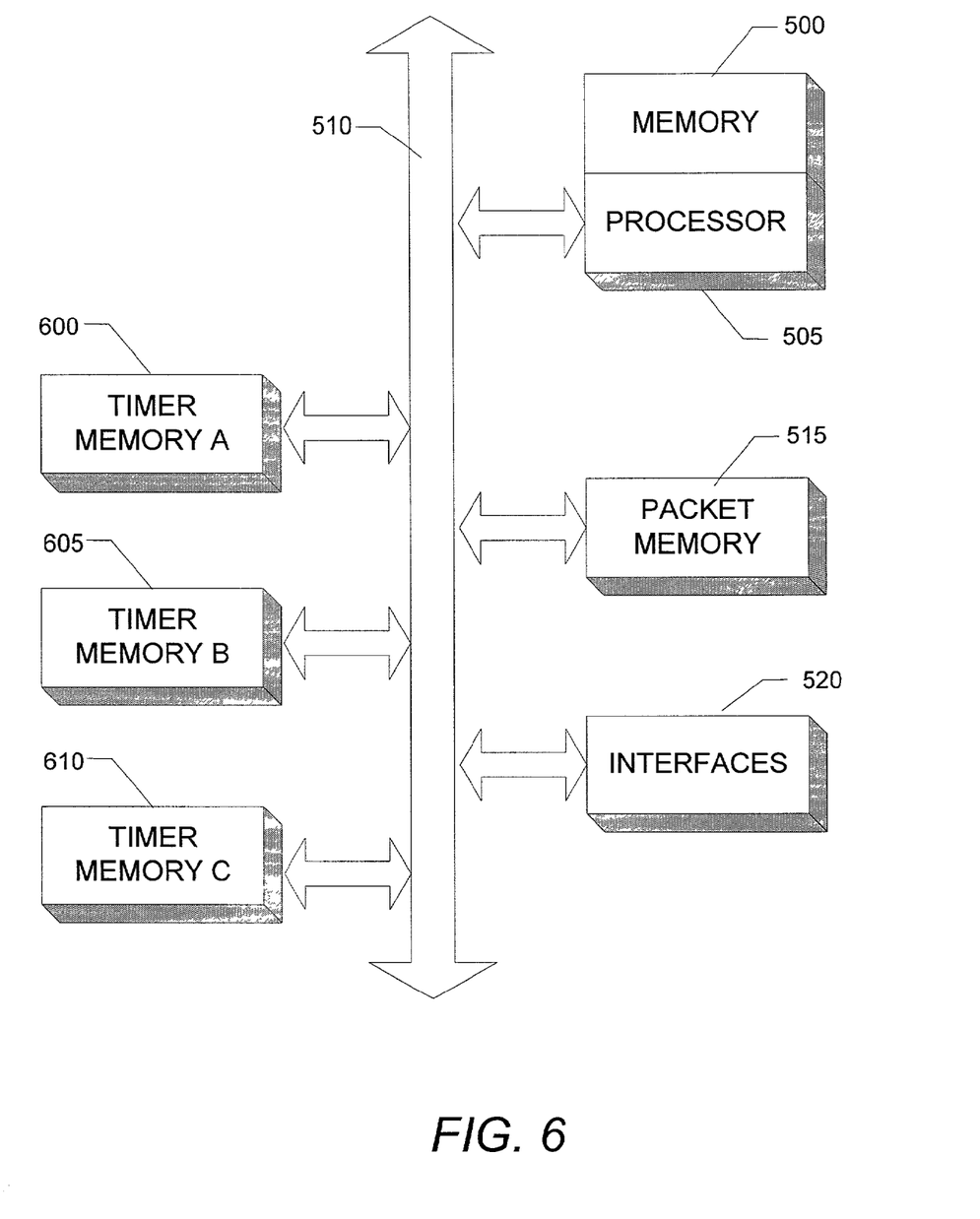
FIG. 6 is a block diagram illustrating a router with timer memories.

FIG. 6 is a block diagram illustrating a router with timer memories. Three timer memories are added to the router of FIG. 5. Timer memories can have timers based on timer length, priority, content, and/or a combination of the three. The memories include a timer memory A 600, a timer memory B 605, and a timer memory C 610. In this embodiment, each of the memories are independently connected to bus 510. Timers (e.g., TCP timers) can be stored on a per flow basis in timer memories 600, 605, and 610. Because storage is based on a per flow basis, and the router can handle up to 128K flows at a single time, 128 or more timers can be stored in one memory at one time. Timer memory A 600, timer memory B 605, and/or timer memory C 610 can be accessed at a predetermined time interval (e.g., N ms, where N is a predetermined number) to verify each timer. If the timer has expired, the process related to the timer is executed by the digital system (e.g., communication network) and the associated timer event is removed from memory. If the timer has not expired, the timer remains in memory until a future verification is made to determine if the timer has expired. As the system, processor 505, timer memory A 600, timer memory B 605, or timer memory C 610 become congested, the memory containing the timer is verified (i.e., inspected) at twice the predetermined time interval (i.e., two times N ms). The increase in time interval slows down the protocol process (e.g., TCP) while allowing a congested router added time to operate on flows that the router currently is processing. Further additional processing times can be provided to allow the router to handle added flows.

In certain cases, such as transmission contents that include voice or real-time video, delays are not desirable. Timer memory A 600, timer memory B 605, and timer memory C 610 can be sorted to provide for different priorities. In particular, as congestion increases, reading of the timer memories 600, 605, or 610, memory (or memories) containing voice and/or video packets is not affected (i.e., the time interval remains at N ms). However, during the same time, memory that contains other content (e.g., email content) is accessed at twice the predetermined time interval (i.e., two times X ms). With additional congestion, the time intervals can be increased accordingly. For example, voice content stored in a particular memory would continue to be accessed at the predetermined time interval (i.e., N ms); video content in a particular memory would be accessed at two times the predetermined time interval (i.e., two times N ms); and other content would be accessed at four times the predetermined time interval (i.e., four times N ms).

Determining content in a particular memory and setting priority can be based on any of the following: contents of the packet, Media Access Control (MAC) address, Internet Protocol (IP) address, the type of service, the class of service type, quality of service metric, service level agreement, or virtual local area network (VLAN) information. Any or all of the preceding data provides information on content type. Determining content based on the preceding data avoids the need to inspect the actual content of the flows or packets stored in memory.

An Example Computing and Network Environment

Figure 7:
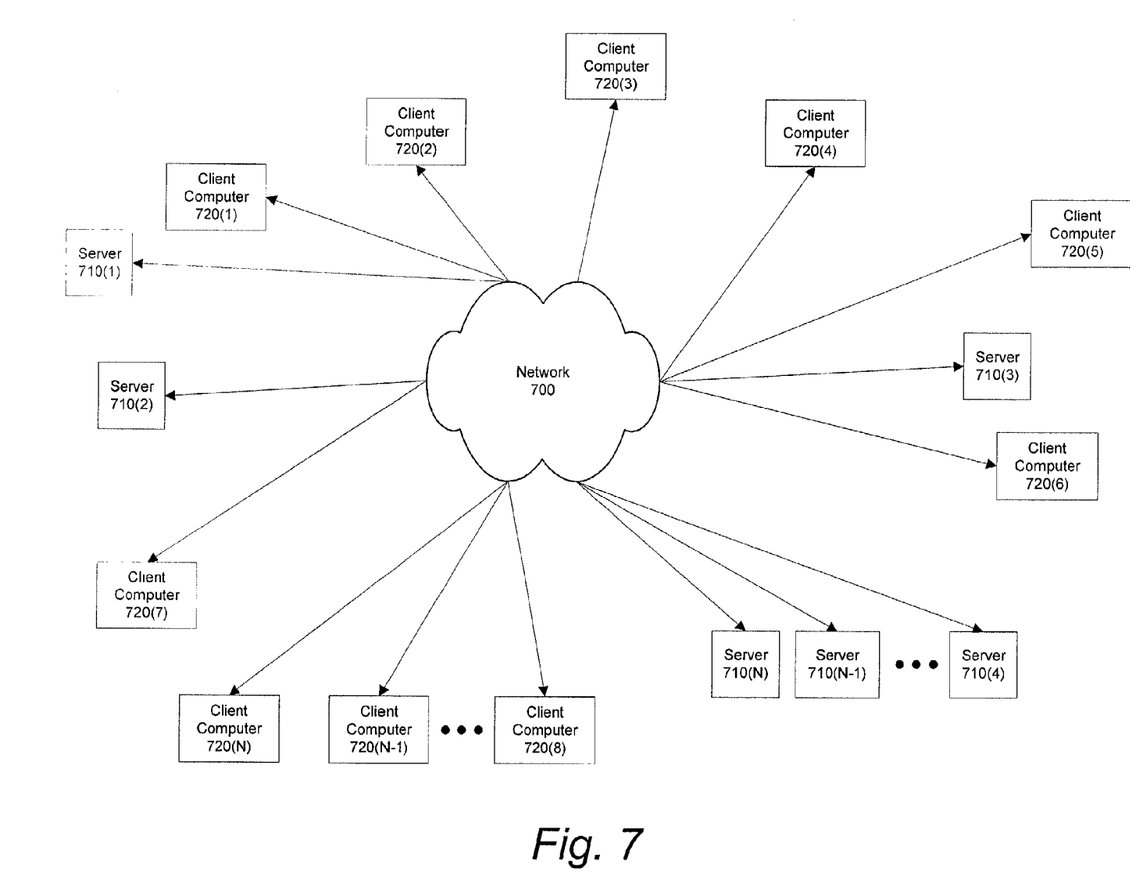
FIG. 7 is a block diagram illustrating a network environment in which a system according to the present invention may be practiced.

FIG. 7 is a block diagram illustrating a network environment in which a system according to the present invention may be practiced. As is illustrated in FIG. 7, network 700, such as a private wide area network (WAN) or the Internet, includes a number of networked servers 710(1)-(N) that are accessible by client computers 720(1)-(N). Communication between client computers 720(1)-(N) and servers 710(1)-(N) typically occurs over a publicly accessible network, such as a public switched telephone network (PSTN), a DSL connection, a cable modem connection or large bandwidth trunks (e.g., communications channels providing T1 or 0C3 service). Client computers 720(1)-(N) access servers 710(1)-(N) through, for example, a service provider. This might be, for example, an Internet Service Provider (ISP) such as America On-Line™, Prodigy™, CompuServe™ or the like. Access is typically had by executing application specific software (e.g., network connection software and a browser) on the given one of client computers 720(1)-(N).

One or more of client computers 720(1)-(N) and/or one or more of servers 710(1)-(N) may be, for example, a computer system of any appropriate design, in general, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or a plurality of I/O devices (i.e., peripheral devices) which are coupled to the system processor and which perforin specialized functions. Examples of I/O devices include modems, sound and video devices and specialized communication devices. Mass storage devices such as hard disks, CD-ROM drives and magneto-optical drives may also be provided, either as an integrated or peripheral device. One such example computer system, discussed in terms of client computers 720(1)-(N) is shown in detail in FIG. 8.

Figure 8:
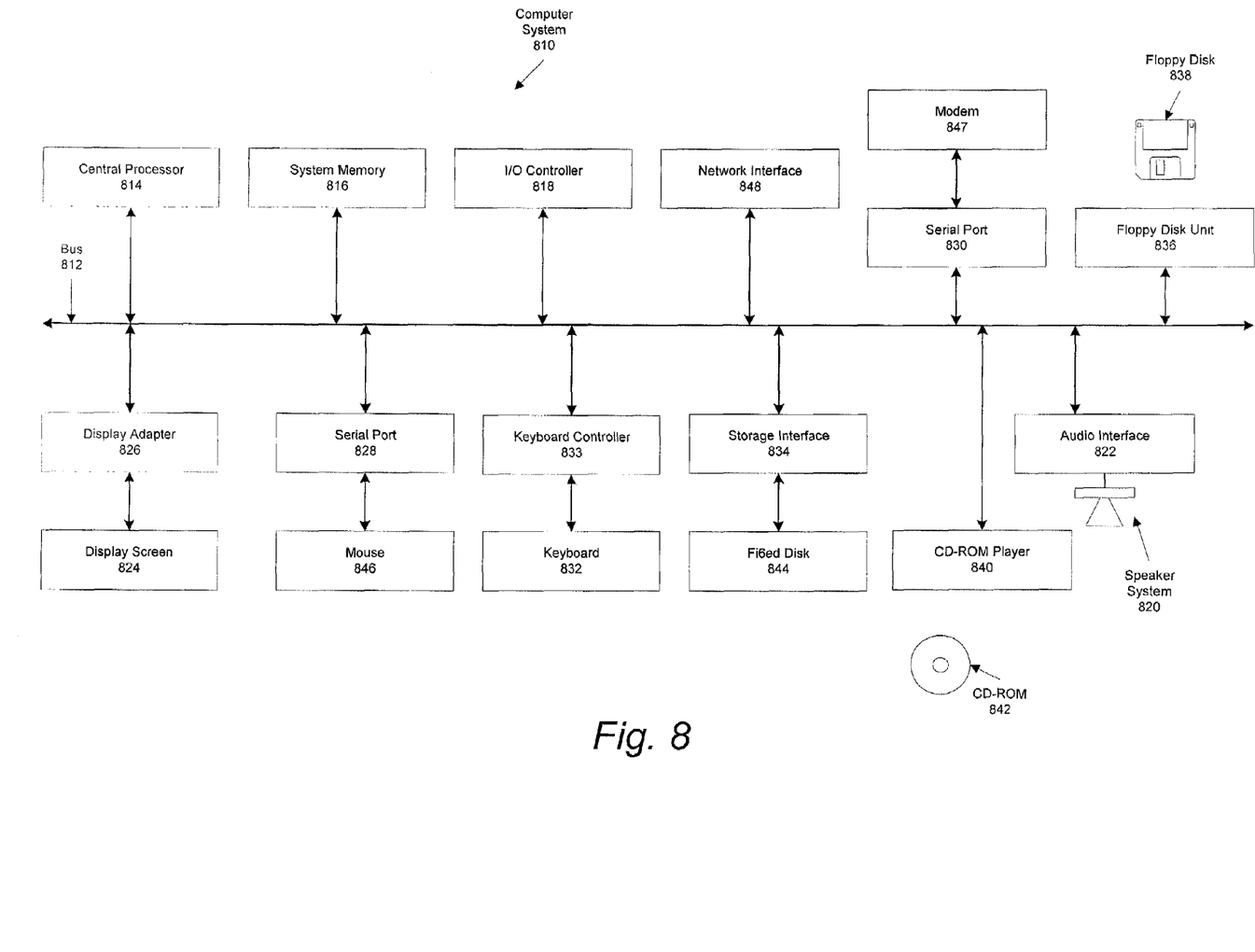
FIG. 8 depicts a block diagram of a computer system suitable for implementing the present invention, and example of one or more of client computers.

FIG. 8 depicts a block diagram of a computer system 810 suitable for implementing the present invention, and example of one or more of client computers 720(1)-(N). Computer system 810 includes a bus 812 which interconnects major subsystems of computer system 810 such as a central processor 814, a system memory 816 (typically RAM, but which may also include ROM, flash RAM, or the like), an input/output controller 818, an external audio device such as a speaker system 820 via an audio output interface 822, an external device such as a display screen 824 via display adapter 826, serial ports 828 and 830, a keyboard 832 (interfaced with a keyboard controller 833), a storage interface 834, a floppy disk drive 836 operative to receive a floppy disk 838, and a CD-ROM drive 840 operative to receive a CD-ROM 842. Also included are a mouse 846 (or other point-and-click device, coupled to bus 812 via serial port 828), a modem 847 (coupled to bus 812 via serial port 830) and a network interface 848 (coupled directly to bus 812).

Bus 812 allows data communication between central processor 814 and system memory 816, which may include both read only memory (ROM) or flash memory (neither shown), and random access memory (RAM) (not shown), as previously noted. The RAM is generally the main memory into which the operating system and application programs are loaded and typically affords at least 64 megabytes of memory space. The ROM or flash memory may contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., CD-ROM drive 840), floppy disk unit 836 or other storage medium. Additionally, applications may be in the form of electronic packets modulated in accordance with the application and data communication technology when accessed via network modem 847 or interface 848.

Storage interface 834, as with the other storage interfaces of computer system 810, may connect to a standard computer readable medium for storage and/or retrieval of information, such as a fixed disk drive 844. Fixed disk drive 844 may be a part of computer system 810 or may be separate and accessed through other interface systems. Many other devices can be connected such as a mouse 846 connected to bus 812 via serial port 828, a modem 847 connected to bus 812 via serial port 830 and a network interface 848 connected directly to bus 812. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 8 to be present to practice the present invention. The devices and subsystems may be interconnected in different ways from that shown in FIG. 8. The operation of a computer system such as that shown in FIG. 8 is readily known in the art and is not discussed in detail in this application. Code to implement the present invention may be stored in computer-readable storage media such as one or more of system memory 816, fixed disk 844, CD-ROM 842, or floppy disk 838. Additionally, computer system 810 may be any kind of computing device, and so includes personal data assistants (PDAs), network appliance, X-window terminal or other such computing device.

The operating system provided on computer system 810 may be MS-DOS®, MS-WINDOWS®, OS/2®, UNIX®, Linux®, Cisco IOS®, CATOS® or other known operating system. Computer system 810 also supports a number of Internet access tools, including, for example, an HTTP-compliant web browser having a JavaScript interpreter, such as Netscape Navigator® 8.0, Microsoft Explorer® 8.0 and the like.

Moreover, regarding the packets described herein, those skilled in the art will recognize that a packet may be directly transmitted from a first block to a second block, or a packet may be modified (e.g., amplified, attenuated, delayed, latched, buffered, inverted, filtered, encoded or otherwise modified) between the blocks. Although the packets of the above described embodiment are characterized as transmitted from one block to the next, other embodiments of the present invention may include modified packets in place of such directly transmitted packets as long as the informational and/or functional aspect of the packet is transmitted between blocks. To some extent, a packet input at a second block may be conceptualized as a second packet derived from a first packet output from a first block due to physical limitations of the circuitry involved (e.g., there will inevitably be some attenuation and delay). Therefore, as used herein, a second packet derived from a first packet includes the first packet or any modifications to the first packet, whether due to circuit limitations or due to passage through other circuit elements which do not change the informational and/or final functional aspect of the first packet.

The foregoing described embodiment wherein the different components are contained within different other components (e.g., the various elements shown as components of computer system 810). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 9:
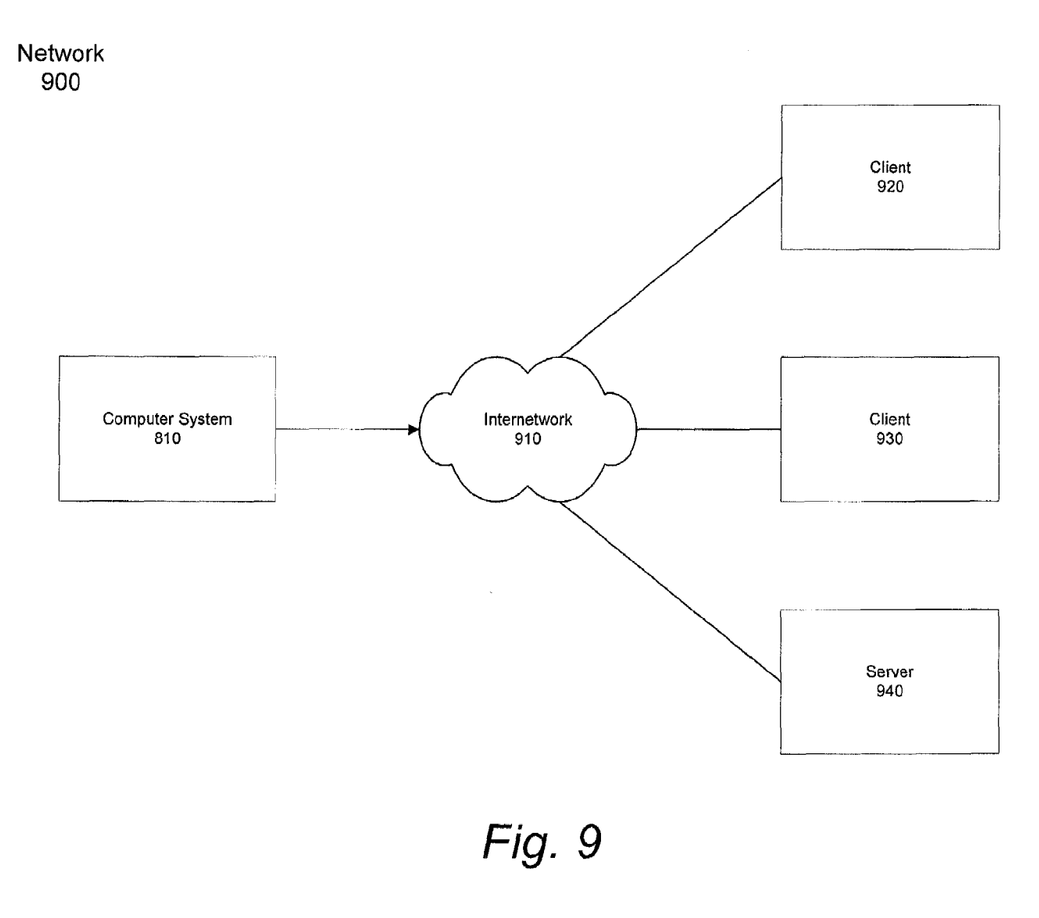
FIG. 9 is a block diagram depicting a network in which a computer system is coupled to an internetwork, which is coupled, in turn, to client systems, as well as a server.

FIG. 9 is a block diagram depicting a network 900 in which computer system 810 is coupled to an internetwork 910, which is coupled, in turn, to client systems 920 and 930, as well as a server 940. Internetwork 910 (e.g., the Internet) is also capable of coupling client systems 920 and 930, and server 940 to one another. With reference to computer system 810, modem 847, network interface 848 or some other method can be used to provide connectivity from computer system 810 to internetwork 910. Computer system 810, client system 920 and client system 930 are able to access information on server 940 using, for example, a web browser (not shown). Such a web browser allows computer system 810, as well as client systems 920 and 930, to access data on server 940 representing the pages of a website hosted on server 940. Protocols for exchanging data via the Internet are well known to those skilled in the art. Although FIG. 9 depicts the use of the Internet for exchanging data, the present invention is not limited to the Internet or any particular network-based environment.

Referring to FIGS. 7, 8 and 9, a browser running on computer system 810 employs a TCP/IP connection to pass a request to server 940, which can run an HTTP "service" (e.g., under the WINDOWS® operating system) or a "daemon" (e.g., under the UNIX® operating system), for example. Such a request can be processed, for example, by contacting an HTTP server employing a protocol that can be used to communicate between the HTTP server and the client computer. The HTTP server then responds to the protocol, typically by sending a "web page" formatted as an HTML file. The browser interprets the HTML file and may form a visual representation of the same using local resources (e.g., fonts and colors).

Although the present invention has been described in connection with several embodiments, the invention is not intended to be limited to the specific forms set forth herein, but on the contrary, it is intended to cover such alternatives, modifications, and equivalents as can be reasonably included within the scope of the invention as defined by the appended claims.

What is claimed is:

1. A method of adjusting a timer comprising:
    defining a plurality of timer activation periods;
    associating each timer activation period of the plurality of timer activation periods with a network condition, wherein the network condition is a characteristic of network congestion carried by a network;
    determining a current network condition;
    selecting, based on the current network condition, one of the timer activation periods from the plurality of timer activation periods;
    adjusting the timer activation period in response to a change in network congestion between a plurality of connection endpoints carried by the network, wherein
        the network congestion comprises a plurality of data flows,
        the number of connection endpoints is variable,
        each connection endpoint is defined by a network address and port number pair,
        the timer activation period comprises a time period between timer-driven interrupts,
        the adjusting comprises altering the timer activation period by increasing the timer activation period in response to detecting an increase in network congestion;
    and
    setting the timer using the timer activation period, wherein the timer is used in communicating information over the network.

2. The method of adjusting a timer of claim 1 wherein adjusting the timer activation period is based on historical data.

3. The method of adjusting a timer of claim 2 further comprising:
    reading at least one memory buffer of the network, wherein the at least one memory buffer stores information from data processing and the data processing is based on available capacity of the at least one memory buffer.

4. The method of adjusting a timer of claim 3 further comprising:
    reading multiple memory buffers of a digital system, wherein the multiple memory buffers store information based on priority.

5. The method of adjusting a timer of claim 4 wherein priority is based on one or more of the following:
    contents of a data packet, a MAC address, an IP address, a port number, type of service, a class of service, a quality of service, a service level agreement, and a VLAN information.

6. The method of adjusting a timer of claim 4 further comprising:
    delaying the reading of timers held in a memory buffer based on the priority of the memory buffer.

7. The method of adjusting a timer of claim 4 further comprising:
    delaying the reading of timers held in a first memory buffer based on the priority of the timers stored in a second memory buffer.

8. The method of adjusting a timer of claim 4 further comprising:
    delaying the reading of timers held in a first memory buffer based on the priority of the data associated with the timers stored in a second memory buffer.

9. The method of adjusting a timer of claim 1 further comprising:
    adjusting a counter for the current network condition wherein a value of the counter relates to an optimal activation period.

10. The method of claim 1 wherein the number of connection endpoints is more than two.

11. A timing unit for a network comprising:
    a timer;
    a memory configured to store the timer; and
    a timing control unit, coupled to the timer, wherein
        the timing control unit is configured to define a plurality of timer activation periods;
        the timing control unit is configured to associate each timer activation period of the timer activation periods with a network condition, wherein the network condition is a characteristic of network congestion carried by a network;
        the timing control unit is configured to determine a current network condition;
        the timing control unit is configured to select, based on the current network condition, one of the timer activation periods from the plurality of timer activation periods;
        the timing control unit is configured to adjust the timer activation period in response to a change in network congestion between a plurality of connection endpoints carried by the network, wherein
            the network congestion comprises a plurality of data flows,
            the number of connection endpoints is variable,
            each connection endpoint is defined by a network address and port number pair,
            the timer activation period comprises a time period between timer-driven interrupts,
            the timing control unit is configured to adjust the timer activation period by altering the timer activation period by increasing the timer activation period in response to detecting an increase in network congestion, and
        the timing control unit is configured to provide the timer activation period to the timer.

12. The timing unit of claim 11 wherein
    the timing control unit is configured to adjust a timer activation period based on a characteristic of network congestion carried by the network by virtue of being configured to
        define a plurality of predetermined timer activation periods, and
        select one of the predetermined timer activation periods as the timer activation period.

13. The timing unit of claim 12 wherein
the characteristic of network congestion carried by the network is a traffic flow condition of the network.

14. The timing unit of claim 12 wherein
the characteristic of network congestion carried by the network is based on historical information.

15. The timing unit of claim 12 further comprising:
a counter that is adjusted for current network conditions wherein a value of the counter relates to an optimal activation period.

16. The timing unit of claim 12 further comprising:
at least one memory buffer of the network, wherein the at least one memory buffer stores information from data processing and the data processing is based on available capacity of the at least one memory buffer.

17. The timing unit of claim 16 further comprising:
multiple memory buffers that are read, wherein the multiple memory buffers store information based on priority.

18. The timing unit of claim 17 wherein priority is based on one or more of the following:
contents of a data packet, a MAC address, an IP address, a port number, type of service, a class of service, a quality of service, a service level agreement, and a VLAN information.

19. The timing unit of claim 17 further comprising:
a memory buffer that stores a prioritized timer, wherein the memory buffer is read depending on priority of the timer.

20. The timing unit of claim 17 further comprising:
a first memory buffer that stores a prioritized timer and data, and
a second memory buffer that stores a prioritized timer and data, wherein either the first or the second memory buffer is read based on priority of the timers.

21. The timing unit of claim 17 further comprising:
a first memory buffer that stores a prioritized timer and data, and
a second memory buffer that stores a prioritized timer and data, wherein either the first or the second memory buffer is read based on data of the timers.

22. A computer system comprising:
a processor;
a computer readable medium coupled to the processor; and
computer code, encoded in the computer readable medium, configured to cause the processor to:
define a plurality of timer activation periods;
associate each timer activation period of the plurality of timer activation periods with a network condition, wherein the network condition is a characteristic of network congestion carried by a network;
determine a current network condition;
select, based on the current network condition, one of the timer activation periods from the plurality of timer activation periods;
adjust the timer activation period in response to a change in network congestion between a plurality of connection endpoints carried by the network, wherein
the network congestion comprises a plurality of data flows,
the number of connection endpoints is variable,
each connection endpoint is defined by a network address and port number pair,
the timer activation period comprises a time period between timer-driven interrupts,
the adjusting comprises altering the timer activation period by increasing the timer activation period in response to detecting an increase in network congestion; and
set the timer using the timer activation period, wherein the timer is used in communicating information over the network.

23. The computer system of claim 22 wherein adjusting the timer activation period is based on historical data.

24. The computer system of claim 23 wherein the processor is further configured to:
read at least one memory buffer of the network, wherein the at least one memory buffer stores information from data processing and the data processing is based on available capacity of the at least one memory buffer.

25. The computer system of claim 24 wherein the processor is further configured to:
read multiple memory buffers of a digital system, wherein the multiple memory buffers store information based on priority.

26. The computer system of claim 25 wherein priority is based on one or more of the following:
contents of a data packet, a MAC address, an IP address, a port number, type of service, a class of service, a quality of service, a service level agreement, and a VLAN information.

27. The computer system of claim 25 wherein the processor is further configured to:
delay the reading of timers held in a memory buffer based on the priority of the memory buffer.

28. The computer system of claim 25 wherein the processor is further configured to:
delay the reading of timers held in a first memory buffer based on the priority of the timers stored in a second memory buffer.

29. The computer system of claim 25 wherein the processor is further configured to:
delay the reading of timers held in a first memory buffer based on the priority of the data associated with the timers stored in a second memory buffer.

30. The computer system of claim 22 wherein the processor is further configured to:
adjust a counter for the current network condition wherein a value of the counter relates to an optimal activation period.

31. An apparatus for adjusting a timer comprising:
means for defining a plurality of timer activation periods;
means for associating each timer activation period of the plurality of timer activation periods with a network condition, wherein the network condition is a characteristic of network congestion carried by a network;
means for determining a current network condition;
means for selecting, based on the current network condition, one of the timer activation periods from the plurality of timer activation periods;
means for adjusting the timer activation period in response to a change in network congestion between a plurality of connection endpoints carried by the network, wherein
the network congestion comprises a plurality of data flows,
the number of connection endpoints is variable,
each connection endpoint is defined by a network address and port number pair,
the timer activation period comprises a time period between timer-driven interrupts, and
the means for adjusting further comprises a means for altering the timer activation period by increasing the timer activation period in response to detecting an increase in network congestion;

means for setting the timer using the timer activation period, wherein the timer is used in communicating information over the network; and a memory configured to store the timer.

32. The apparatus for adjusting a timer of claim 31 wherein adjusting the timer activation period is based on historical data.

33. The apparatus of adjusting a timer of claim 32 further comprising:

means for reading at least one memory buffer of the network, wherein the at least one memory buffer stores information from data processing and the data processing is based on available capacity of the at least one memory buffer.

34. The apparatus of adjusting a timer of claim 33 further comprising:

means for reading multiple memory buffers of a digital system, wherein the multiple memory buffers store information based on priority.

35. The apparatus of adjusting a timer of claim 34 wherein priority is based on one or more of the following:

contents of a data packet, a MAC address, an IP address, a port number, type of service, a class of service, a quality of service, a service level agreement, and a VLAN information.

36. The apparatus of adjusting a timer of claim 34 further comprising:

means for delaying the reading of timers held in a memory buffer based on the priority of the memory buffer.

37. The apparatus of adjusting a timer of claim 34 further comprising:

means for delaying the reading of timers held in a first memory buffer based on the priority of the timers stored in a second memory buffer.

38. The apparatus of adjusting a timer of claim 34 further comprising:

means for delaying the reading of timers held in a first memory buffer based on the priority of the data associated with the timers stored in a second memory buffer.

39. The apparatus of adjusting a timer of claim 31 further comprising:

means for adjusting a counter for the current network condition wherein a value of the counter relates to an optimal activation period.

40. A computer program product, encoded in computer readable storage media, comprising:

a first set of instructions, executable on a computer system, configured to define a plurality of timer activation periods;

a second set of instructions, executable on a computer system, configured to associate each timer activation period of the plurality of timer activation periods with a network condition, wherein the network condition is a characteristic of network congestion carried by the network;

a third set of instructions, executable on a computer system, configured to determine a current network condition;

a fourth set of instructions, executable on a computer system, configured to select, based on the current network condition, one of the timer activation periods from the plurality of timer activation period baseds;

a fifth set of instructions, executable on a computer system, configured to adjust the timer activation period in response to a change in network congestion between a plurality of connection endpoints carried by the network, wherein the network congestion comprises a plurality of data flows, the number of connection endpoints is variable, each connection endpoint is defined by a network address and port number pair, the timer activation period comprises a time period between timer-driven interrupts, the fifth set of instructions comprises instructions configured to alter the timer activation period by increasing the timer activation period in response to detecting an increase in network congestion; and a sixth set of instructions, executable on a computer system, configured to set the timer using the timer activation period, wherein the timer is used in communicating information over the network.

41. The computer program product of claim 40 wherein adjusting the timer activation period is based on historical data.

42. The computer program product of claim 41 further comprising:

an eighth set of instructions, executable on a computer system, configured to read at least one memory buffer of the network, wherein the at least one memory buffer stores information from data processing and the data processing is based on available capacity of the at least one memory buffer.

43. The computer program product of claim 42 further comprising:

an eighth set of instructions, executable on a computer system, configured to read multiple memory buffers of a digital system, wherein the multiple memory buffers store information based on priority.

44. The computer program product of claim 43 wherein priority is based on one or more of the following:

contents of a data packet, a MAC address, an IP address, a port number, type of service, a class of service, a quality of service, a service level agreement, and a VLAN information.

45. The computer program product of claim 43 further comprising:

a ninth set of instructions, executable on a computer system, configured to delay the reading of timers held in a memory buffer based on the priority of the memory buffer.

46. The computer program product of claim 43 further comprising:

a tenth set of instructions, executable on a computer system, configured to delay the reading of timers held in a first memory buffer based on the priority of the timers stored in a second memory buffer.

47. The computer program product of claim 43 further comprising:

an eleventh set of instructions, executable on a computer system, configured to delay the reading of timers held in a first memory buffer based on the priority of the data associated with the timers stored in a second memory buffer.

48. The computer program product of claim 40 further comprising:

a seventh set of instructions, executable on a computer system, configured to adjust a counter for the current network condition wherein a value of the counter relates to an optimal activation period.

* * * * *